United States Patent
Engeler et al.

(10) Patent No.: US 7,052,656 B2
(45) Date of Patent: May 30, 2006

(54) COLUMN FOR CARRYING OUT AN ISOTOPE EXCHANGE BETWEEN A LIQUID SUBSTANCE AND A GASEOUS SUBSTANCE

(75) Inventors: Christian Engeler, Kefikon (CH); Hans Ruckstuhl, Winterthur (CH); Richard Zmasek, Winterthur (CH)

(73) Assignee: Sulzer Chemtech AG, Winterthur (CH)

(*) Notice: Subject to any disclaimer, the term of this patent is extended or adjusted under 35 U.S.C. 154(b) by 656 days.

(21) Appl. No.: 10/054,194

(22) Filed: Nov. 13, 2001

(65) Prior Publication Data
US 2002/0079259 A1    Jun. 27, 2002

(30) Foreign Application Priority Data
Nov. 24, 2000  (EP) ................. 00811120

(51) Int. Cl.
*B01J 8/00*  (2006.01)
*B01J 8/02*  (2006.01)
*B01D 3/00*  (2006.01)

(52) U.S. Cl. .............. 422/195; 422/188; 422/189; 422/191; 422/195; 202/156; 203/29

(58) Field of Classification Search ........ 422/188–191, 422/193, 195; 202/156, 158; 203/28, 29
See application file for complete search history.

(56) References Cited
U.S. PATENT DOCUMENTS
4,314,972 A * 2/1982 Nakane et al. ............. 422/191
4,471,014 A * 9/1984 den Hartog et al. ........ 428/182
6,835,287 B1 * 12/2004 Kihara et al. .............. 202/154

FOREIGN PATENT DOCUMENTS
DE        2938223 A    4/1980

* cited by examiner

Primary Examiner—Alexa D. Neckel
(74) Attorney, Agent, or Firm—Townsend and Townsend and Crew LLP

(57) ABSTRACT

The column is provided for carrying out an isotope exchange (EM) between a liquid substance (L) and a gaseous substance (G) using a catalytic reaction (EK). In this reaction the isotope exchange between molecules of the vaporized liquid substance (V) and molecules of the gaseous substance (G) takes place through a heterogeneous catalysis. The column comprises a plurality of modules (M) which are arranged vertically one above the other and which are in each case subdivided into two regions K and A which are serially connected by a connection region (C). The catalytic reaction can be carried out in the region K on a first packing (2). A substance exchange (E1, E2) between a liquid and a gaseous phase which contains vapor can be carried out in the region A by means of a second packing (3) for compensating substance concentrations. During the operation of the column a transport of the gaseous substance (G, V) which contains vapor is driven through the modules as a result of pressure gradients. In this the transport direction is changed at least once in the connection region, and indeed from a downward direction to an upward direction, whereas the liquid substance (L) is forwarded downwardly through the modules through the action of gravity alone.

11 Claims, 3 Drawing Sheets

| 1 | 1a | 1b |
|---|---|---|
|  | L | V |
| $H_2O$ | $L_{11}$ | $V_{11}$ |
| HDO | $L_{12}$ | $V_{12}$ |
| HTO | $L_{13}$ | $V_{13}$ |
| $D_2O$ | $L_{22}$ | $V_{22}$ |
| DTO | $L_{23}$ | $V_{23}$ |
| $T_2O$ | $L_{33}$ | $V_{33}$ |

| 2 | 2a |
|---|---|
|  | G |
| $H_2$ | $G_{11}$ |
| HD | $G_{12}$ |
| HT | $G_{13}$ |
| $D_2$ | $G_{22}$ |
| DT | $G_{23}$ |
| $T_2$ | $G_{33}$ |

$$L_{23} + G_{22} \Leftrightarrow G_{23} + L_{22} \quad (EM)$$

$$L_{23} \Leftrightarrow V_{23} \quad (E1)$$

$$V_{23} + G_{22} \Leftrightarrow G_{23} + V_{22} \quad (EK)$$

$$V_{22} \Leftrightarrow L_{22} \quad (E2)$$

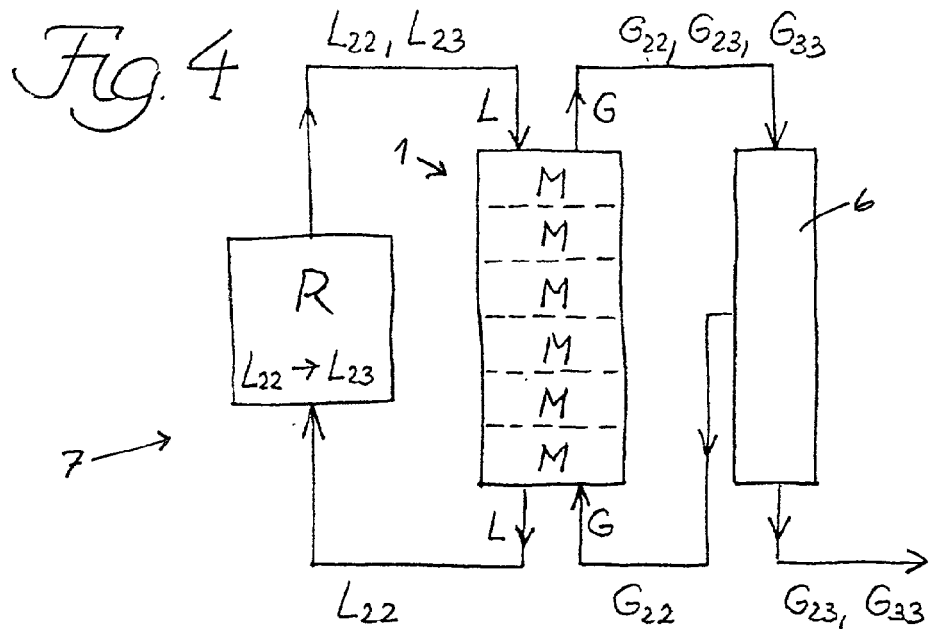
Fig. 4
$$L_{11} \Leftrightarrow V_{11} \tag{E1'}$$
$$V_{11} + G_{12} \Leftrightarrow G_{11} + V_{12} \tag{EK'}$$
$$V_{12} \Leftrightarrow L_{12'} \tag{E2'}$$
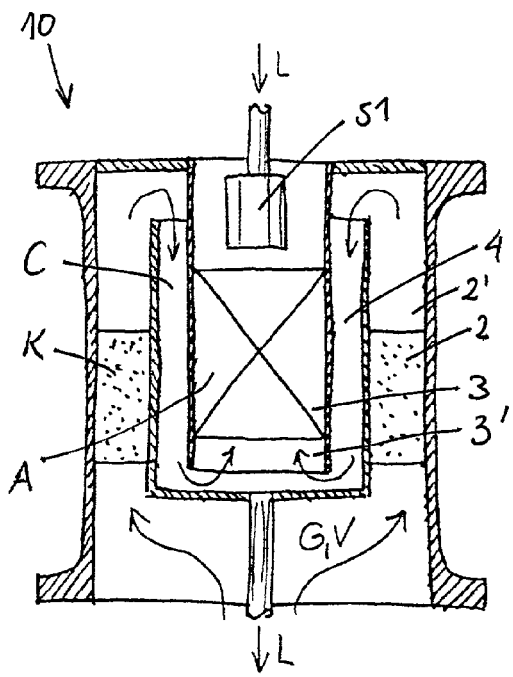
Fig. 5
Fig. 6

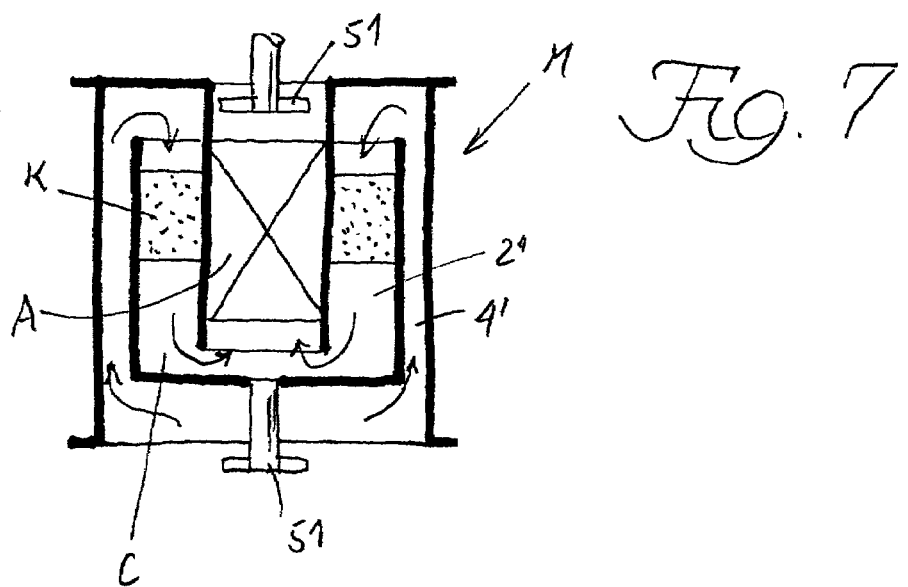
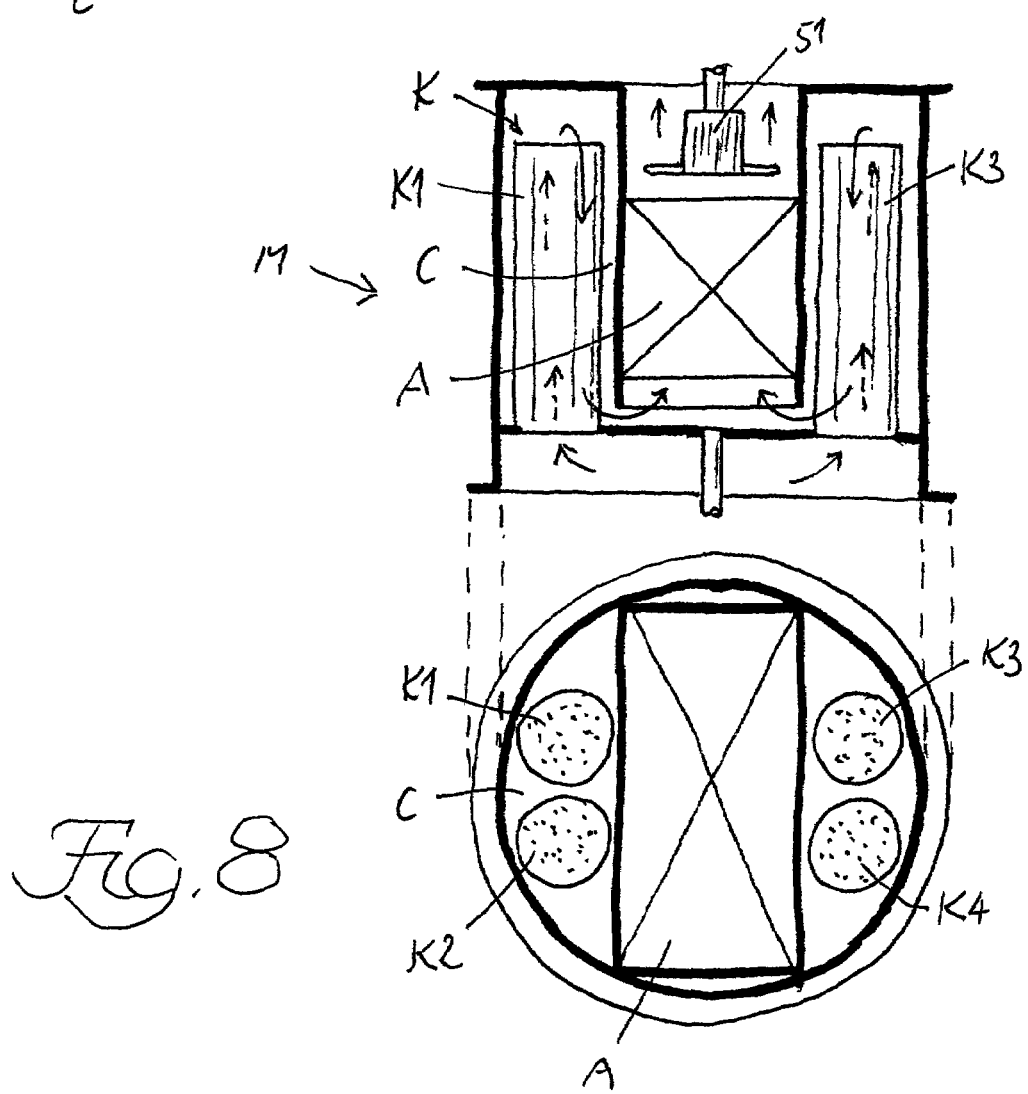

COLUMN FOR CARRYING OUT AN ISOTOPE EXCHANGE BETWEEN A LIQUID SUBSTANCE AND A GASEOUS SUBSTANCE

BACKGROUND OF THE INVENTION

The invention relates to a column for carrying out an isotope exchange between a liquid substance and a gaseous substance using a catalytic reaction. It also relates to uses of the column.

A method is known from U.S. Pat. No. 4,143,123 by means of which an exchange of hydrogen isotopes can be carried out, namely between liquid water $H_2O$ and hydrogen gas $H_2$, in which the hydrogen H ("protium") is partly substituted by deuterium D or tritium T. In this method a central role is played by a reversible reaction in which an isotope which is bound in a hydrogen molecule is catalytically substituted by a hydrogen isotope of a water molecule. This reaction is sufficiently efficient only when the catalytically active material is dry, i.e. remains unwetted by liquid water. A catalytically active material has therefore been developed which is coated with a semi-permeable film which is hydrophobic and hence water repellent on the one hand but which is however permeable for free water molecules from an environment which is formed by water vapor or a moist gas on the other hand.

SUMMARY OF THE INVENTION

An object of the invention is to create a column in which for example an exchange of hydrogen isotopes between liquid water and hydrogen gas can be carried out and in which measures are realized, as a result of which a contamination or wetting of the catalyst by the liquid does not occur. In addition the column should be free of dead spaces.

The column is provided for carrying out an isotope exchange between a liquid substance and a gaseous substance using a catalytic reaction. In this reaction the isotope exchange between molecules of the vaporized liquid substance and molecules of the gaseous substance takes place through a heterogeneous catalysis. The column comprises a plurality of modules which are arranged vertically one above the other and which are in each case subdivided into two regions K and A which are serially connected by a connection region. The catalytic reaction can be carried out in the region K on a first packing. A substance exchange between a liquid and a gaseous phase which contains vapor can be carried out in the region A by means of a second packing for compensating substance concentrations. During the operation of the column a transport of the gaseous substance which contains vapor is driven through the modules as a result of pressure gradients. In this the transport direction is changed at least once in the connection region, and indeed from a downward direction to an upward direction, whereas the liquid substance is forwarded downwardly through the modules through the action of gravity alone.

In the following the invention will be explained with reference to the drawings.

BRIEF DESCRIPTION OF THE DRAWINGS

FIG. 2 is part of a longitudinal section through a column in accordance with the invention, FIG. 3 is a diagram in which changes of substance concentrations for a module of the column are qualitatively illustrated, FIG. 4 is a schematic illustration of a plant with a nuclear reactor and a device for the de-enrichment of tritium from heavy water, FIG. 5 shows relationships pertaining to a further example of an isotope exchange, FIG. 6 shows a module pertaining to a column in accordance with the invention which has a centrally symmetrical construction, and FIGS. 7, 8 show two further variants of the module.

DESCRIPTION OF THE PREFERRED EMBODIMENTS

Figure 1:
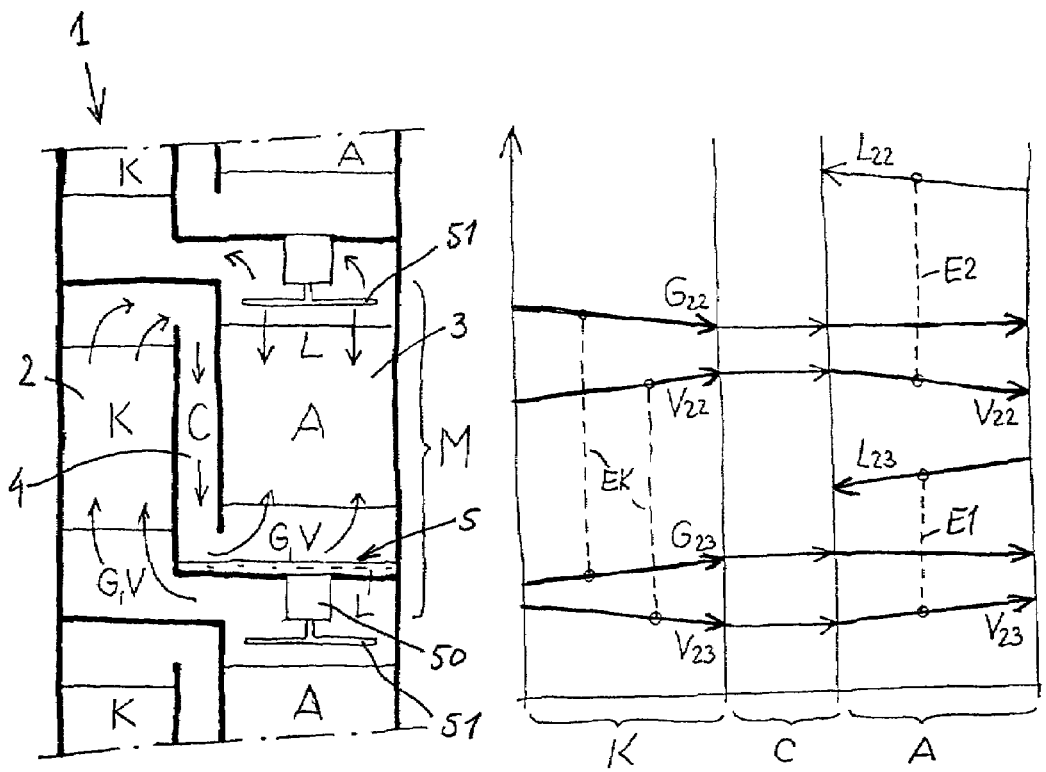
FIG. 1 is a tabulation of abbreviating designations as well as relationships relating to the isotope exchange.

The isotope exchange, for the carrying out of which the column in accordance with the invention is provided, takes place between a liquid L and a gas G, with it being necessary for the liquid L to be present as a vapor V for a catalytic partial step of the isotope exchange. The liquid L is for example heavy water $D_2O$ in which a certain proportion of its molecular components has a different composition in regard to the isotopes: in $D_2O$ (=$L_{22}$ in accordance with the relationships tabulated in FIG. 1, columns 1 and 1a) a deuterium D is substituted by tritium T, so that DTO (=$L_{23}$) forms a second component. Other examples are also possible in which L consists of a different mixture of two or more of the components $L_{ij}$ (with the indices i, j=1, 2 or 3), which are tabulated in FIG. 1. The vapor D of the liquid L has a corresponding composition of components $D_{ij}$ (i, j=1, 2, 3), the meaning of which can be found in the columns 1 and 1b in FIG. 1. The gas G consists analogously of components $G_{ij}$ (i, j=1, 2, 3), the meaning of which is given in the columns 2 and 2b. It should be observed that the composition of the three isotopes H, D and T can be read off on the basis of the indices i and j: the index 1 corresponds to a H, the index 2 to a D and the index 3 to a T.

In FIG. 1 relationships by means of which the isotope exchange is symbolically illustrated are additionally given for an example. The relationship EM relates to the reversible isotope exchange between $L_{23}$ and $G_{22}$ in the one reaction direction or between $L_{22}$ and $G_{23}$ in the reverse reaction direction; the relationship EM thus describes the exchange of T and D between heavy water and heavy hydrogen. This exchange EM, which relates to a module M of a column 1 in accordance with the invention (cf. FIG. 2), takes place via physical-chemical partial steps, namely exchange processes which take place in two separate regions A and K of the module M and which can be represented by the relationships E1, EK and E2. E1 and E2 are reversible aggregate state changes of water molecules, namely the vaporization of the components $L_{23}$ and $L_{22}$ respectively and the condensation of the components $V_{22}$ and $V_{23}$ respectively. In these exchange processes there results a substance exchange between a liquid and a gaseous phase containing vapor, which leads to a compensation of oxygen concentrations. The relationship EK represents the catalytic reaction which takes place in the region K of the module M: molecules of the gas G and of the vapor V are adsorbed on a catalytically active material and are again desorbed from the latter, with the isotope exchange taking place with a certain probability in the adsorbed state.

The column 1 which is partly illustrated in FIG. 2 comprises a plurality of modules M which are arranged vertically one above the other. These are in each case subdivided into two regions K and A which are serially connected by a passage 4 or connection region C. In the region K the catalytic reaction EK takes place on a packing 2 which is flowed through by the gas G containing the vapor V. In the region A a substance exchange which is based on the state changes E1 and E2 between the liquid L and the gas flow consisting of G and V is produced by means of a packing 3. After passage through the packing 3 the liquid L is conducted further via a collector 5 to a distributor 51 of the adjacent module. The liquid collector 5 contains a siphon-like drain 50 by means of which a upward passing through of gas can be prevented.

The transport of the gas flow consisting of G and V is driven by pressure gradients. The gas flow passes upwardly in the region K, downwardly in the connection region C, and upwardly again in the region A. The liquid L is forwarded downwards through the modules M of the column 1 by gravity alone.

A filling of porous particles, on the surface of which a catalytically active material is applied, can be used as a packing 2. Examples of catalysts are given in the already named U.S. Pat. No. 4,143,123. For the substance exchange in the region A an ordered packing 3 can be used. This latter is in particular built up of vertical layers which contain inclined channels which are produced from corrugated material surfaces and which thereby form a cross channel structure with channels which cross openly. The packing 2 can also be formed as an ordered packing with a cross channel structure in which a wash coat is used as a carrier of the catalytic material. The packing 3 can correspondingly be formed of a filling of packing bodies. The packing 3 is advantageously manufactured of copper, since a copper oxide film which is easily wettable can be produced on copper.

The architecture of the column 1, which is schematically illustrated in FIG. 2, has the following advantages: There are no detrimental dead spaces, since all spatial regions are flowed through. The two regions A and K are screened off from one another in such a manner that no liquid drops can pass from A to K. Droplets of this kind would on the one hand impair the efficiency of the catalysis in K; on the other hand copper would be transported by the droplets, which would contaminate the catalyst and thus reduce its reactivity.

FIG. 3 shows with reference to a diagram how the concentrations of the components $G_{ij}$, $V_{ij}$ and $L_{ij}$ vary as a result of the exchange processes E1, EK and E2 (see FIG. 1) in a module M of the column 1. The variations are illustrated only qualitatively. The couplings of the concentrations as a result of the exchange processes E1, EK and E2 are made recognizable with broken connection lines. The curve sections are illustrated as arrows in order to make the directions of movement of the components $G_{ij}$, $V_{ij}$ and L through the regions A, C and K visible.

FIG. 4 shows a schematic illustration of a plant 7 with a nuclear reactor R in which heavy water (=L with the component $L_{22}$) is used as a moderator and cooling water. Through neutron capture D is converted into T in the heavy water. In the column 1 in accordance with the invention the tritium is de-enriched from the heavy water (=L with the components $L_{22}$ and $L_{23}$) by means of a gas flow (=G with the component $G_{22}$) consisting of D2. The gas flow (=G with the components $G_{22}$, $G_{23}$ and $G_{33}$) which is charged with tritium is regenerated in a low temperature column 6, with tritium being separated off (in the form of $G_{23}$ and $G_{33}$).

The column in accordance with the invention can also be used for winning heavy water. The exchange processes E1', EK' and E2' are summarized in FIG. 5. In this method a hydrogen gas which contains D forms the gaseous substance G and a mixture of light and heavy water forms the liquid substance L. Deuterium is given off from G to L; at the same time hydrogen (i.e. protium) is taken up from L by G.

FIG. 6 shows a module M pertaining to a column in accordance with the invention which is formed as a boiler shell ring or pipe length 10 and which is formed centrally symmetrically. The packing 3 for the substance exchange E1 and E2 is located in a cylindrical chamber 3' which forms the region A. The connection region C comprises a first ring space 4, which is arranged concentrically to the region A. The region K with the packing 2 is formed by a second concentric ring space 2'. The liquid L is distributed onto the packing 3 by a cylindrical distributor 51.

FIG. 7 shows a further centrally symmetrical module in which the region K is located in a ring space 2'' which is arranged directly around the central region A. An outer ring space 4' forms a connection region between adjacent modules M. In the connection region C between the regions A and K, which is no longer formed as a separate partial space in this example, the transport direction of the gas flow which consists of G and V is changed only once: After a flowing through the region K—downwardly—the flow changes on passage through the connection region C into the reverse direction, which is directed upwards. Thanks to this change of direction there is no danger that droplets pass from the region A into the region K.

The further embodiment in FIG. 8—illustrated as longitudinal section and cross-section—has a region K which is composed of a plurality of partial regions K1, K2, K3 and K4 which are arranged in parallel. The space between these partial regions forms a part of the connection region C. The packing 3 of the region A is arranged in a space having the shape of a rectangular parallelepiped.

The invention claimed is:

1. Column for carrying out an isotope exchange (EM) between a liquid substance (L) and a gaseous substance (G) using a catalytic reaction (EK) in which the isotope exchange between molecules of the vaporized liquid substance (V) and molecules of the gaseous substance (G) takes place through a heterogeneous catalysis, said column comprising a plurality of modules (M) which are arranged vertically one above the other and which are in each case subdivided into two regions K and A which are serially connected by a connection region (C) for carrying out the catalytic reaction in the region K on a first packing and a substance exchange (E1, E2) between a liquid and a gaseous phase which contains vapor in the region A by means of a second packing for compensating substance concentrations, a transport of the gaseous substance (G, V) which contains vapor being driven through the modules as a result of pressure gradients during the operation of the column and the liquid substance flowing in a downward direction through the modules through the action of gravity alone, the regions K and A being horizontally offset from each other, and a liquid flow channel in fluid connection with region A directing the gravitational flow of the liquid substance through the modules and preventing the liquid substance from flowing through the region K.

2. Column in accordance with claim 1, characterized in that the transport through the modules (M) of the gaseous substance (G, V) which contains vapor in each case being conducted upwardly through the region K, downwardly through the connection region (C) and upwardly through the region A.

3. Column in accordance with claim 1, characterized in that a filling of porous particles, on the surface of which a catalytically active material is applied, is used for the first packing.

4. Column in accordance with claim 1, characterized in that the second packing is an ordered packing built up of vertical layers comprising inclined channels defined by corrugated material surfaces and forming a cross channel structure with openly crossing channels.

5. Column in accordance with claim 1, characterized in that the flow channel includes a liquid collector having a siphon drain preventing an upward passing of the gaseous substance (G, V) past the siphon drain.

6. Column in accordance with claim 1, characterized in that the region A comprises a cylindrical chamber for the second packing; in that the connection region (C) comprises a first ring space which is arranged concentrically about the region A; in that the region K is formed by a second concentric ring space; and in that respective ends of the first ring space are in fluid communication with the region A and the region K.

7. Column in accordance with claim 1, characterized in that the region K is composed of a plurality of partial regions (K1, K2, K3, K4) which are arranged in parallel; and in that the space between the partial regions forms a part of the connection region (C).

8. Column in accordance with claim 1, characterized in that the second packing includes copper; and in that a surface of the copper is defined by a copper oxide film.

9. A column for carrying out an isotope exchange between a liquid and a gas using a catalytic reaction in which the isotope exchange between molecules of the liquid in its vaporized state and molecules of the gas takes place through a heterogeneous catalysis, the column comprising a plurality of alternating first regions holding a first packing and second regions holding a second packing which are in flow communication with each other permitting the liquid in its vaporized state to flow serially through the alternating first and second regions, the first and second regions being offset from each other in a horizontal direction and respective first and second regions being vertically arranged above each other, and a flow diverter at a lower end of each second region for gravitationally flowing the liquid from one second region to the next second region and bypassing the first region so that the liquid flows only through the second regions of the column.

10. A column according to claim 9 including a flow connection between a downstream end of the first region in the flow direction of the liquid in its vapor state and a downstream end of the second region in the flow direction of the liquid.

11. A column for carrying out an isotope exchange between a liquid and a gas using a catalytic reaction in which the isotope exchange between molecules of the liquid in its vaporized state and the molecules of the gas takes place through a heterogeneous catalysis, the column comprising a plurality of first regions, each first region having an upstream intake and a downstream outlet located above the intake, a plurality of second regions arranged vertically above each other and holding a second packing, the first and second regions being horizontally offset relative to each other, each second region including an upstream intake for the liquid at an upper end of the second region and a downstream outlet at a lower end of the second region, a gas flow connection extending in a downwardly sloping direction from the outlet of the first region to the outlet of the second region permitting the liquid in its vapor state to flow in a generally downward direction from the outlet of the first region to the outlet of the second region, and a one-way flow passage between respective intakes and outlets of the second regions permitting the liquid to gravitationally flow from one second region to the next without flowing through the first regions and preventing the liquid in its vaporized state from flowing from one second region to the next second region without flowing through the respective first regions.

* * * * *